United States Patent [19]

Coleman-Kammula et al.

[11] Patent Number: 5,063,088
[45] Date of Patent: Nov. 5, 1991

[54] PROCESS FOR PRODUCING REINFORCED POLYMER COMPOSITIONS

[75] Inventors: Seetha Coleman-Kammula; Johannes C. M. Gillemans, both of Amsterdam, Netherlands

[73] Assignee: Shell Oil Company, Houston, Tex.

[21] Appl. No.: 393,159

[22] Filed: Aug. 14, 1989

[30] Foreign Application Priority Data

Nov. 25, 1988 [GB] United Kingdom ............... 8827400

[51] Int. Cl.$^5$ .................. B05D 3/00; B05D 3/04
[52] U.S. Cl. .................. 427/352; 427/336; 427/389.7
[58] Field of Search .......... 427/398.7, 178, 169, 427/165, 352, 336, 407.1

[56] References Cited

U.S. PATENT DOCUMENTS

| 3,694,412 | 9/1972 | Nozaki | 260/63 CQ |
| 4,407,866 | 10/1983 | Kitamura et al. | 427/221 |
| 4,425,384 | 1/1984 | Brownscombe | 427/221 |
| 4,513,032 | 4/1985 | Klinkowski | 427/336 |
| 4,775,708 | 10/1988 | Smutney et al. | 524/108 |
| 4,826,926 | 5/1989 | Lutz | 525/412 |
| 4,851,482 | 7/1989 | Danforth et al. | 525/455 |
| 4,859,729 | 8/1989 | Smutney | 524/170 |
| 4,868,254 | 9/1989 | Wong | 525/539 |
| 4,880,865 | 11/1989 | George | 525/85 |
| 4,919,978 | 4/1990 | Winkler et al. | 427/407.3 |

FOREIGN PATENT DOCUMENTS

| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |

Primary Examiner—Michael Lusignan
Assistant Examiner—Diana L. Dudash
Attorney, Agent, or Firm—James O. Okorafor

[57] ABSTRACT

An improved process for the production of compositions comprising (1) a linear alternating polymer of carbon monoxide and at least one ethylenically unsaturated hydrocarbon and (2) a fibrous inorganic reinforcement material comprises coating the inorganic reinforcement with a solution of the linear alternating polymer and subsequently removing the solvent of such solution.

11 Claims, No Drawings

PROCESS FOR PRODUCING REINFORCED POLYMER COMPOSITIONS

FIELD OF THE INVENTION

The present invention relates to certain fiber reinforced thermoplastic compositions. More particularly, the invention relates to compositions comprising linear alternating polymers of carbon monoxide and at least one olefinically unsaturated hydrocarbon reinforced with inorganic fibrous materials.

BACKGROUND OF THE INVENTION

The class of polymers of carbon monoxide and olefin(s) has been known for some time. Brubaker, 2,495,286, produced such polymers of relatively low carbon monoxide content in the presence of free radical initiators, e.g., peroxy compounds. U.K. 1,081,304 discloses polymers of higher carbon monoxide content produced in the presence of alkylphosphine complexes of palladium as catalyst. Nozaki produced linear alternating polymers in the presence of arylphosphine complexes of palladium moieties and certain inert solvents. See, for example, U.S. Pat. No. 3,694,412.

The class of linear alternating polymers of carbon monoxide and at least one ethylenically unsaturated hydrocarbon has become of greater interest in part because of the greater availability of the polymers. The more recent processes for the production of such polymers, now known as polyketones or polyketone polymers, are illustrated by a number of published European Patent Applications including 121,965, 181,014, 213,671 and 257,663. The process typically involves the use of a catalyst composition formed from a compound of a Group VIII metal selected from palladium, cobalt or nickel, the anion of a non-hydrohalogenic acid having a pKa below about 6, preferably below 2, and a bidentate ligand of phosphorus, arsenic or antimony.

The resulting polyketone polymers are relatively high molecular weight materials having established utility as premium thermoplastics in the production of shaped articles by methods conventional for thermoplastics. The polyketone polymers are well suited for use as engineering thermoplastics because of properties of high strength, rigidity and impact resistance. It would be useful, however, in some applications to have certain properties which are somewhat different from those of the polyketone polymers. In particular, it would be of advantage on occasion to have reduced shrinkage as within a mold during cooling following injection molding and to have even better mechanical properties.

One method for providing reduced mold shrinkage and mechanical properties is to incorporate within the polymer reinforcing materials and particularly inorganic fibrous reinforcing materials. In copending U.S. patent application Ser. No. 289,157, filed Dec. 23, 1988, there are disclosed compositions comprising the linear alternating polymer and glass fiber. In copending U.S. patent application Ser. No. 137,800, filed Dec. 24, 1987, there are disclosed related compositions comprising the linear alternating polymers and certain ceramic fiber reinforcement. The typical methods of producing a composition comprising an organic polymer and an inorganic fiber reinforcement involve the use of an extruder or an internal mixer operating at an elevated temperature. These methods have certain disadvantages in that they are best suited for use with short fibers, i.e., chopped fibers, and a limited proportion of fiber can be incorporated before the viscosity of the composition being produced becomes unacceptably high. The production of reinforced compositions by such a high shear method serves to cause fiber breakage and is not suitable for production of a composite where the reinforcement is present in an oriented manner or as a continuous fiber. It would be of advantage to provide an improved method for the production of composites comprising a linear alternating polymer of carbon monoxide and at least one ethylenically unsaturated hydrocarbon and inorganic fiber.

SUMMARY OF THE INVENTION

The present invention provides an improved method of producing thermoplastic composites of a linear alternating polymer of carbon monoxide and at least one ethylenically unsaturated hydrocarbon and inorganic fibrous reinforcements. More particularly, the invention provides a process whereby a fibrous, inorganic reinforcement is coated with a solution of the linear alternating polymer in a suitable solvent and, upon subsequent removal of the solvent, a composition comprising the linear alternating polymer and inorganic fiber is produced

DESCRIPTION OF THE INVENTION

The compositions of the invention comprise linear alternating polymer of carbon monoxide and at least one ethylenically unsaturated hydrocarbon and an inorganic fibrous reinforcing material. The ethylenically unsaturated hydrocarbons useful as precursors of the linear alternating polymer have up to 20 carbon atoms inclusive, preferably up to 10 carbon atoms, and are aliphatic such as ethylene and other alpha-olefins including propylene, 1-butene, isobutylene, 1-hexene and 1-dodecene, or are arylaliphatic containing an aryl substituent on an otherwise aliphatic molecule, particularly an aryl substituent on a carbon atom of the ethylene unsaturation. Illustrative of this latter class of ethylenically unsaturated hydrocarbons are styrene, p-methylstyrene, p-ethylstyrene and m-propylstyrene. The preferred polyketone polymers are copolymers of carbon and ethylene or terpolymers of carbon monoxide, ethylene and a second hydrocarbon of at least 3 carbon atoms, particularly an alpha-olefin such as propylene.

The polyketone polymers have a linear alternating structure and contain substantially one molecule of ethylenically unsaturated hydrocarbon for each molecule of carbon monoxide. When the preferred terpolymers are employed in the compositions of the invention, there will be at least about two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain of the preferred polymers is therefore represented by the repeating formula

$$-CO-CH_2-CH_2)]_x[-CO-G-]_y \qquad (I)$$

wherein G is a moiety of a second hydrocarbon of at least 3 carbon atoms polymerized through the ethylene unsaturation. The $-CO-(-CH_2-CH_2-)-$ units and any $-CO-(G-G-)-$ ( units are found randomly throughout the polymer chain and the ratio of y:x is no more than about 0.5. In the modification where copolymers of carbon monoxide and ethylene are employed without the presence of second hydrocarbon, the polymers are represented by the above formula wherein y is 0. When y is other than 0, i.e., terpolymers are employed, preferred ratios of y:x are from about 0.01 to about 0.1. The end groups or "caps" of the polymer chain will depend upon what materials were present during the production of the polymer and whether or how the polymer was purified. The precise nature of the end groups is of little apparent significance so far as the overall properties of the polymer are concerned so that the polymers are fairly represented by the formula for the polymer chain as above depicted.

Of particular interest are the polyketone polymers of number average molecular weight above about 1000 and preferably from about 20,000 to about 90,000, as determined by gel permeation chromatography. The physical properties of the polymers will depend in part upon the molecular weight, whether the polymer is a copolymer or a terpolymer and, in the case of terpolymers the nature of and the proportion of the second hydrocarbon present. Typical melting points of the polymers are from about 175° C. to about 300° C., preferably from about 210° C. to about 275° C. They will have a limiting viscosity number (LVN), measured in m-cresol at 60° C., of above 0.5 dl/g and preferably from about 0.8 dl/g to about 10 dl/g.

The process for the production of the polyketone polymers is illustrated by the above published European Patent Applications and a process now becoming broadly conventional is to contact the carbon monoxide and hydrocarbon(s) in the presence of a palladium compound, the anion of a non-hydrohalogenic acid having a pKa (measured in water at 18° C.) of below about 6 and preferably below 2, and a bidentate ligand of phosphorus. The scope of the process for polymerization is extensive but, without wishing to be limited, a preferred palladium salt is a palladium alkanoate, particularly palladium acetate, a preferred anion is the anion of trifluoroacetic acid or p-toluenesulfonic acid, and a preferred bidendate ligand of phosphorus is 1,3-bis(diphenylphosphino)propane or 1,3-bis[di(2-methoxyphenyl)phosphino]propane.

Polymerization is conducted in the liquid phase by contacting the reactants under polymerization conditions in the presence of the catalyst composition and a reaction diluent. Suitable reaction diluents include the lower alkanols and methanol is preferred. Typical polymerization temperatures are from about 20° C. to about 150° C., preferably from about 50° C. to about 135° C. Useful reaction pressures are from about 1 bar to about 200 bar but pressures from about 10 bar to about 100 bar are generally more satisfactory. Subsequent to reaction the polymerization is terminated as by cooling the reactor and contents and releasing the pressure. The polyketone polymer is customarily obtained as a product substantially insoluble in the reaction diluent and is recovered by conventional methods such as filtration or decantation. The polymer is used as recovered or is purified as by contact with a solvent or complexing agent selective for catalyst residues.

The fibrous inorganic reinforcing material is one of a variety of conventional materials employed for this purpose. In one modification, the fibrous inorganic reinforcement is two-dimensional such as a mat, woven or non-woven, as illustrated by mats of glass fibers. In an alternate modification, the fibrous inorganic reinforcing material is substantially unidimensional as illustrated by continuous or chopped fibers. The chemical nature of the inorganic fibrous material is also variable and suitable materials of construction for the material are glass, ceramic or carbon fibers.

To produce the compositions of the invention, the fibrous inorganic reinforcing material is first coated with a solution of the linear alternating polymer. In order to obtain good impregnation between the polymer and the fibrous material, the viscosity of the polymer solution is of some importance. Suitable polymer solutions are solutions of the linear alternating polymer in a suitable solvent which have a viscosity from about 0.5 Pa.s. to about 10 Pa.s. at the temperature at which the polymer solution is to be contacted with the fibrous reinforcing material. Preferably the viscosity of the polymer solution at the temperature of contacting should be from about 1 Pa.s. to about 4 Pa.s. The solvents which are useful in the preparation of the coating solutions are hexafluoroisopropanol, m-cresol or mixtures thereof. The solution may additionally have minor amounts of other materials as illustrated by hydrocarbons, e.g. toluene or hexane, alkanols such as methanol or ethanol, alkanones such as acetone or methyl ethyl ketone and acids such as formic acid or acetic acid. These components are generally regarded as non-solvents and the preferred coating solutions are solutions of the linear alternating polymer in hexafluoroisopropanol or m-cresol or mixtures thereof.

The method by which the fibrous reinforcing material is contacted with and coated with the polymer solution is not material so long as the method provides a uniform coating of the fiber by polymer solution and does not result in polymer degradation or breaking of the reinforcing material. In one modification, a woven fibrous material is coated with polymer solution by passing through a polymer solution bath followed by passage through rollers to improve the degree of impregnation. Loose glass fibers are coated by mixing the fibers and the polymer solution under conditions designed to minimize the breakage of the fibers. A continuous fiber is suitably coated with polymer solution by merely passing the continuous fiber through the solution of the polymer.

By whatever method the fibrous reinforcing material is coated with polymer-containing solution, it is necessary to remove the solvent of the solution in order to obtain the polymer coated fiberous compositions of the invention. Such methods of solvent removal are broadly conventional and well known. In one modification, the fibrous material coated with polymer solution is heated to remove the solvent of the solution by evaporation. In a generally preferred embodiment, however, the solvent is removed by a process of extraction as by contacting the fibrous material coated with polymer solution with a selective solvent which will dissolve the solvent of the polymer solution but which is a non-solvent for the polymer. Such selective solvents include alkanols such as methanol or ethanol, alkanones such as acetone or methyl ethyl ketone, or hydrocarbons such as toluene, n-hexane or isooctane. The preferred selective solvent for this purpose is acetone. When the solvent of the polymer solution is removed by extraction, the fibrous material coated with polymer solution is typically passed through a bath of the selective solvent in which the extraction takes place. The polymer coated fibrous material is then typically dried as by passage through hot air to remove traces of the selective extraction solvent.

By whatever method is employed to remove the solvent of the coating polymer solution, the resulting product is a polymer-coated, fibrous inorganic reinforcement composition. The proportions of the polymer and the fibrous reinforcement may be varied and will depend upon the particular nature of the reinforcement and the coating process. The product compositions will typically have from about 1% by volume to about 90% by volume of the fibrous inorganic reinforcement material but preferred compositions have from about 5% by volume to about 60% by volume of the reinforcement material. These polymer compositions are thermoplastic and are characterized by properties of low shrinkage when molded and by properties of strength and rigidity. Accordingly, the compositions are particularly useful where dimensional precision and strength are desired, for example, in the production of both internal and external parts for automotive applications.

The invention is further illustrated by the following Illustrative Embodiments which should not be construed as limiting the invention.

ILLUSTRATIVE EMBODIMENT I

A linear alternating terpolymer of carbon monoxide, ethylene and propylene was produced which had a propylene content of 6.6% mol, a LVN, measured in m-cresol at 60° C. of 2.1 dl/g and a melting point of 218° C. Five grams of this terpolymer and 95 grams of m-cresol were mechanically stirred at 20°-23° C. to provide a solution having a viscosity of 1.61 Pa.s. at 22° C. There were subsequently added to the solution 6 grams of chopped fibers, 6 mm in length. The fibers were of glass marketed as Silenka 8031. The fibers had been dried at 75° C. for 25 hours. The mixture of glass fibers and solution was continued to fibrillate the glass fibers and obtain a uniform dispersion of monofilament-like fibers. The dispersion was transferred to a vertically positioned conical reservoir equipped with a gas inlet at the top and with a horizontal outlet tube at the bottom of the reservoir. This outlet tube had an internal diameter of 4 mm and was equipped with a stop cock.

Nitrogen gas was introduced into the reservoir above the polymer solution to create sufficient pressure to force a steady flow of fiber-containing polymer solution when the stop cock was opened. The flow was in the form of a continuous liquid thread of polymer solution and it was passed through an acetone-containing extraction bath of approximately 100 cm in length. The result was a substantially solvent-free, fiber-containing polymer thread which was dried in hot air. The glass fiber content of the polymer thread was 8.25% by volume and the fibers were generally oriented parallel to the axis of the thread.

ILLUSTRATIVE EMBODIMENT II

A linear alternating copolymer of carbon monoxide and ethylene was produced which had an LVN of 2.1 dl/g and a melting point of 260° C. A solution was prepared by mixing 0.3 g of this copolymer and 99.7 g of hexafluoroisopropanol. A polymer-coated continuous glass fiber was prepared through the use of a tapered glass capillary having a diameter of 5 mm and an opening of 0.5 mm. A continuous glass fiber, made from Silenka 010-P-75-300, was introduced into the capillary at the top and leaving at the bottom. The fiber emerging from the bottom of the capillary was guided via two rollers through an acetone-containing extraction bath of approximately 100 cm in length and then through a shaft where it contacted hot air to a take-up reel.

The polymer solution was introduced into the capillary and with the aid of the take-up reel a glass fiber coated with polymer solution was drawn from the capillary at a speed of approximately 10 cm/min. The hexafluoroisopropanol solvent was removed during passage through the extraction bath to produce the fiber, coated with the linear alternating copolymer, which was subsequently dried and collected upon the take-up reel.

What is claimed is:

1. A process of producing a polymer composition comprising (1) a linear alternating polymer of carbon monoxide and at least one ethylenically unsaturated hydrocarbon and (2) a fibrous inorganic reinforcing material, comprising the steps of:
   (a) uniformly coating the fibrous inorganic material with a solution of the linear alternating polymer, said solution having a viscosity of from about 0.5 Pa.s to about 10 Pa.s.; and
   (b) subsequently removing the solvent of said solution with a selective solvent which will dissolve the solvent of the linear alternating polymer solution but is a non-solvent for the linear alternating polymer.

2. The process of claim 1 wherein the linear alternating polymer is represented by the repeating formula

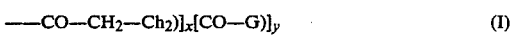
$$-\!-\!CO\!-\!CH_2\!-\!Ch_2)]_x[CO\!-\!G)]_y \qquad (I)$$

wherein G is a moiety of an ethylenically unsaturated hydrocarbon of at least 3 carbon atoms polymerized the ethylenic unsaturation thereof and the ratio of y:x is no more than about 0.5.

3. The process of claim 2 wherein the solvent of the solution of the linear alternating polymer is hexafluoroisopropanel, m-cresol or mixtures thereof.

4. The process of claim 2 wherein y is 0.

5. The process of claim 2 wherein G is a moiety of propylene and the ratio of y:x is from about 0.01 to about 0.1.

6. The process of claim 2 wherein the fibrous inorganic reinforcing material is glass fiber.

7. The process of claim 2 wherein the glass fiber is a continuous glass fiber.

8. A process as in claim 7 wherein the glass fiber is present in an amount of about 60% volume of the product.

9. A process as in claim 1 wherein said selective solvent is selected from the group consisting of alkanols, alkanones, and hydrocarbons.

10. A process as in claim 1 wherein said selective solvent is acetone.

11. A process as in claim 1 wherein said solution has a viscosity of from about 1 to about 4 Pa.s.

* * * * *